US010824179B1

(12) United States Patent
Haynold

(10) Patent No.: US 10,824,179 B1
(45) Date of Patent: Nov. 3, 2020

(54) HVAC BILLING AND OPTIMIZATION SYSTEM

(71) Applicant: Oliver Markus Haynold, Evanston, IL (US)

(72) Inventor: Oliver Markus Haynold, Evanston, IL (US)

(*) Notice: Subject to any disclaimer, the term of this patent is extended or adjusted under 35 U.S.C. 154(b) by 0 days.

(21) Appl. No.: 14/450,282

(22) Filed: Aug. 4, 2014

Related U.S. Application Data

(60) Provisional application No. 61/867,019, filed on Aug. 16, 2013, provisional application No. 61/863,381, filed on Aug. 7, 2013.

(51) Int. Cl.
G05D 23/19 (2006.01)
F28F 27/00 (2006.01)

(52) U.S. Cl.
CPC .............. *G05D 23/19* (2013.01); *F28F 27/00* (2013.01)

(58) Field of Classification Search
CPC ........ H02J 3/14; H02J 2003/143; F28F 27/00; F28F 27/02; G05D 23/19; G05D 23/1902; G05D 23/1904
USPC ........................................................ 700/295
See application file for complete search history.

(56) References Cited

U.S. PATENT DOCUMENTS

| 5,039,010 A | 8/1991 | Juntunen |
| 5,598,349 A | 1/1997 | Elliason |
| 6,357,667 B1 | 3/2002 | Young |
| 6,622,925 B2 | 9/2003 | Carner et al. |
| 6,633,823 B2 | 10/2003 | Bartone et al. |
| 7,752,856 B2 | 7/2010 | Kondou et al. |
| 8,280,556 B2 | 10/2012 | Besore et al. |
| 8,463,453 B2 * | 6/2013 | Parsons, Jr. ............... H02J 3/14 315/149 |
| 2004/0034484 A1 | 2/2004 | Ewald et al. |
| 2004/0178889 A1 * | 9/2004 | Buckingham ....... H04L 12/2816 340/328 |
| 2005/0194456 A1 * | 9/2005 | Tessier ................... G05B 13/02 236/51 |
| 2006/0007627 A1 | 1/2006 | Lewis |
| 2007/0140238 A1 | 6/2007 | Auclair et al. |
| 2009/0105888 A1 * | 4/2009 | Flohr ..................... G06Q 30/00 700/295 |
| 2010/0017045 A1 * | 1/2010 | Nesler ................. B60L 11/1824 700/296 |
| 2011/0118890 A1 * | 5/2011 | Parsons .................... H02J 3/14 700/295 |
| 2011/0218690 A1 * | 9/2011 | O'Callaghan .......... G06Q 10/06 700/295 |
| 2012/0248211 A1 | 10/2012 | Warren et al. |
| 2012/0273580 A1 | 11/2012 | Warren et al. |
| 2012/0325919 A1 | 12/2012 | Warren et al. |
| 2013/0125572 A1 | 5/2013 | Childs |

* cited by examiner

Primary Examiner — William V Gilbert

(57) ABSTRACT

According to one embodiment, an adapter to connect an industry-standard low-voltage thermostat to a central HVAC system that may be a two-pipe system with a mains-voltage fan-coil unit that is equipped with a usage counter which may be read out wirelessly. Through the same wireless connection, the adapter may respond to changes in the price of electricity. Additional embodiments add features to the usage counter and communication capability.

13 Claims, 3 Drawing Sheets

PRIOR ART NOT CLAIMED

HVAC BILLING AND OPTIMIZATION SYSTEM

RELATED APPLICATIONS

This application claims priority from my provisional patent application 61/863,381 for an Energy-Price Optimizer filed on 7 Aug. 2013 and my provisional patent application 61/867,019 for a Thermostat Adapter filed on 16 Aug. 2013, which are hereby incorporated in full into this application.

This application is related to my utility patent application Ser. No. 14/450,278 for a Thermostat Adapter, filed on 3 Aug. 2014, which is hereby incorporated in full into this application.

FIELD OF THE INVENTION

This invention relates to the field of allocating and reducing cost for heating and cooling units of a central HVAC system, in particular fan-coil units.

PRIOR ART

The following is a tabulation of some prior art patent documents that appear relevant:

U.S. Pats.

| Pat. No. | Kind Code | Issue Date | Patentee |
| --- | --- | --- | --- |
| 5,039,010 | $B_1$ | 1991 Aug. 13 | Juntunen |
| 5,598,349 | A | 1997 Jan. 28 | Elliason & Schnell |
| 6,357,667 | $B_1$ | 2002 Mar. 19 | Young |
| 6,622,925 | $B_2$ | 2003 Sep. 23 | Garner et al. |
| 6,633,823 | $B_2$ | 2003 Oct. 14 | Bartone et al. |
| 7,752,856 | $B_2$ | 2010 Jul. 13 | Kondou et al. |
| 8,280,556 | $B_2$ | 2012 Oct. 02 | Besore et al. |
| 8,463,453 | $B_2$ | 2013 Jun. 11 | Parsons |

U.S. Pat. Application Publications

| Publication Number | Kind Code | Publication Date | Applicant |
| --- | --- | --- | --- |
| 2004,003,4484 | $A_1$ | 2004 Feb. 19 | Ewald et al. |
| 2006,000,7627 | $A_1$ | 2006 Jan. 12 | Lewis |
| 2007,0140,238 | $A_1$ | 2007 Jun. 21 | Auclair et al. |
| 2012,024,8211 | $A_1$ | 2012 Oct. 04 | Warren et al. |
| 2012,027,3580 | $A_1$ | 2012 Nov. 01 | Warren et al. |
| 2012,032,5919 | $A_1$ | 2012 Dec. 27 | Warren et al. |
| 2013,012,5572 | $A_1$ | 2013 May 23 | Childs & Rognli |

BACKGROUND

Large residential buildings, such as apartment complexes or student dormitories, as well as schools and offices are commonly equipped with central HVAC systems. Common configurations include one-pipe, two-pipe, and four-pipe systems. In all of these configurations, a heating and/or cooling medium that is most commonly water but for heating may also be steam, is centrally heated or cooled and then pumped through pipes throughout the building. The medium then flows through fan-coil unit ventilators where the heat or cold is partially transferred to the air in the rooms to be heated or chilled.

FIG. 1 shows a fan-coil unit ventilator 100 (in the following just 'fan-coil unit') for a two-pipe system as it is commonly installed in apartment buildings and similar structures. Its primary components are an electric fan 102 and a coil 104 that exchanges heat between the heating or cooling medium and the air forced through it by the fan 102. The unit is connected to mains power through hot wire 108 and neutral wire 110. A switch 106 installed in the unit allows the user to switch the unit on an off. If switched on, the switch 106 allows electricity to pass through wire 112 to the fan 102, setting it in motion. A central heating and/or cooling plant pumps the heating/cooling medium, typically water, into pipe 114. From there, a junction that may include a balancer valve diverts a certain amount of that water through pipe 118 into the coil 104. If the fan is operating and the water is hot, the air forced through the coil will be heated, and if the water is cold the air will be chilled. Then the water passes back through pipes 120 and 122 to the central plant to be heated or cooled again.

Such two-pipe systems are very popular, especially in older buildings but also in some new structures, because of their low cost of installation. The switch 106, which may also offer high and low settings instead of just on and off, gives the resident of each room a rudimentary level of control over the desired temperature. Alternatively to the two-pipe system shown, several fan-coil unit ventilators may be installed serially with the water exiting from one unit flowing into the next unit. This one-pipe system is not very popular anymore. Instead of the two pipes, one to and one from the heating plant, there may also be four pipes, with separate pipes for cooling and heating media from the plant and separate return pipes for each, which is known as a four-pipe system. The four-pipe system has the advantage over the two-pipe system that some rooms can be cooled while other rooms are being heated, whereas two-pipe systems are restricted to either heating or cooling for the entire building and thus require seasonal or more frequent changeovers between heating and cooling. In four-pipe systems, valves, which can be either manually or automatically actuated, need to shut off the flow of the cooling medium when heating is desired and the flow of the heating medium when cooling is desired.

The temperature control provided by a simple on/off or off/low/high switch is very crude, however. There is no thermostatic control provided. One solution is for users to operate the switch frequently according to the present room temperature, which is inconvenient and impossible to do while a room is not being occupied or the resident is busy or sleeping. The most common solution in practice thus is for the user to set the fan-coil unit to provide more heating or cooling than is desired and getting a more fine-grained control of the temperature by cracking a window open. This solution is grossly wasteful of energy invested for heating and cooling.

My patent application Ser. No. 14/450,278 teaches a way to control such fan-coil units by means of an adapter that allows easy retrofitting of a modern thermostat by introducing an easily installed adapter that creates an interface between the fan-coil unit and a modern thermostat.

One reason why such wasteful use patterns as regulating the temperature by opening the window can persist is that fan-coil units not only have been hard to retrofit with thermostats, but it was also difficult or impossible to measure and bill use of heating and cooling by unit. Thus, for example, in apartment complexes comprising many apartments it is common to allocate HVAC cost through assessments instead of billing to each occupant a fair share of the cost according to how much he has used the HVAC system.

This removes almost all incentives for residents to be good citizens and use HVAC services in an economically sensible fashion.

There is, therefore, a long-standing need to reduce the gross waste associated with fan-coil units where residents have to regulate the temperature, for economic reasons as well as for environmental ones.

SUMMARY

According to one embodiment, an adapter to connect an industry-standard low-voltage thermostat to a central HVAC system that may be a two-pipe system with a mains-voltage fan-coil unit that is equipped with a usage counter which may be read out wirelessly. Through the same wireless connection, the adapter may respond to changes in the price of electricity. Additional embodiments add features to the usage counter and communication capability.

ADVANTAGES

Some advantages of some embodiments include:
a) The adapter allows the use of industry-standard, low-voltage thermostats, which are cheaper than mains voltage thermostats or specialized thermostats for fan-coil units.
b) The adapter allows the central HVAC system to anticipate heating and cooling demand.
c) The adapter allows charging users for the amount of heating and cooling they consume, thus allocating cost more equitably among users and providing an incentive to conserve energy.
d) The adapter allows real-time electricity pricing to be passed on to users of cooling power from an HVAC system.
e) The adapter allows automatic responses to changes in real-time electricity prices.

DRAWINGS—REFERENCE NUMERALS

Figure 1:
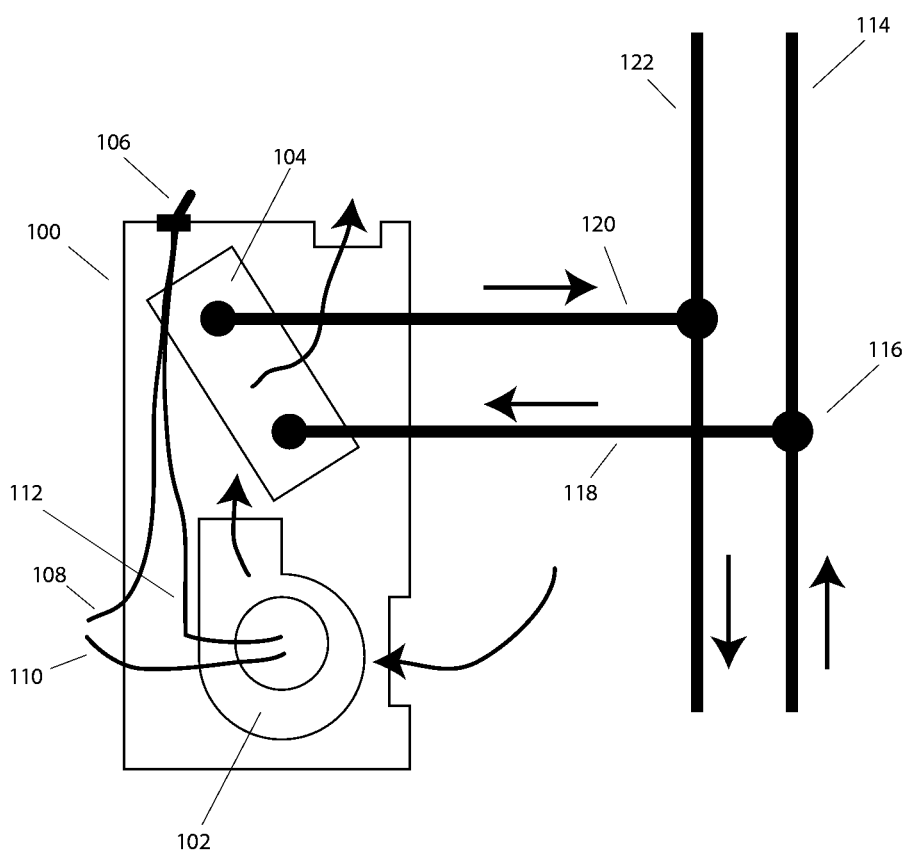
FIG. 1—PRIOR ART NOT CLAIMED shows a fan-coil unit ventilator.

100 Fan-coil unit ventilator
102 Electric radial fan
104 Heat exchange coil
106 Switch
108 Mains power hot wire
110 Mains power neutral wire
112 Mains power switched wire
114 Water pipe from central heating/cooling plant
116 Junction/balancer valve
118 Water pipe into fan-coil unit
120 Water pipe out of fan-coil unit
122 Return water pipe to central heating/cooling plant
200 Adapter
202 Black adapter wire-mains power hot wire in
204 White adapter wire-mains power neutral
206 Red adapter wire-mains power hot wire to fan-coil unit
208 Twist-on wire connector-mains power to fan-coil unit
210 Twist-on wire connector-mains power neutral
212 Twist-on wire connector-mains power in
214 Mains power hot wire
216 Mains power neutral wire
218 Fan-coil unit neutral wire
220 Fan-coil unit hot wire
222 Water pipe into fan-coil unit
224 Temperature sensor
226 Strap
228 Thermostat terminal connectors
230 Thermostat cable
232 Counter display
300 Fan-coil unit
302 Thermostat adapter with wireless signaling
304 Thermostat
306 Temperature sensor for water flowing out of fan-coil unit
308 Temperature sensor for water flowing into fan-coil unit
310 Water pipes carrying water from central HVAC plant to fan-coil units
312 Water pipes carrying water to central HVAC plant from fan-coil units
314 Central HVAC plant
316 Central HVAC plant control terminal
318 Signal of wireless mesh network between thermostat adapters

DETAILED DESCRIPTION—FIGS. 2 & 3

First Embodiment

Installation

Figure 2:
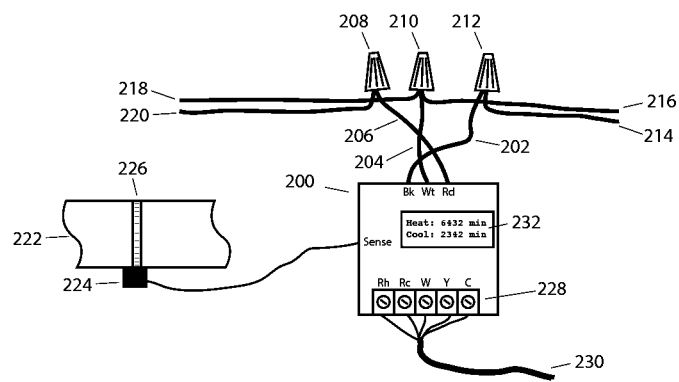
FIG. 2 shows the installation of one embodiment of the adapter.

FIG. 2 shows the first embodiment, the adapter 200 meant for installation on a two-pipe fan-coil unit, as it is connected to the fan-coil unit and a thermostat. The installation will usually be made within the fan-coil unit or in an electric utility box close to it. The adapter 200 is enclosed in a case of non-conducting polymer. Alternatively, it may be enclosed in a grounded metal case. This makes the adapter safe to handle and easy to install as the only parts accessible by the installer that have connection to mains power are the three wires 202, 204, and 206. Their color coding and function is equivalent to the convention for light switches and similar devices, making installation very easy and intuitive for the installer.

The installer has cut the wires 108 and 100 in FIG. 1. The hot wire 108 coming from mains is now wire 214 in FIG. 2, and the neutral wire 110 coming from mains is now wire 216 in FIG. 2. The hot wire 108 going to the fan-coil unit is wire 220 in FIG. 2, and the neutral wire 100 going to the fan-coil unit is wire 218. The twist-on wire connector 210 connects the neutral wire 216 coming from mains power, the neutral wire 204 of the adapter, and the neutral wire 218 going to the fan-coil unit. The twist-on wire connector 212 connects the hot wire coming from mains power 214 to the adapter's mains hot wire 202. The twist-on wire connector 208 connects the switched hot wire 206 coming out of the adapter to the fan-coil unit's hot wire 220. Again, this is exactly how light switches, dimmers, and so on are usually wired up and may be accomplished by any electrician in a short time, and these are the only connections exposed to mains power.

The adapter 200 also has a temperature sensor 224, which is tied to the water pipe 222 leading into the fan-coil unit (118 in FIG. 1), by means of a strap 226. This temperature sensor enables the adapter to sense whether the two-pipe HVAC system is in heating or in cooling mode.

The adapter has a block of terminal connectors 228, which are connected to a thermostat cable, which leads to an industry-standard thermostat (not shown). All of these connections are low voltage and may safely be installed by someone not qualified as an electrician. The wire connections on the terminal connector 228 are labeled according to the industry-standard conventions for thermostat wires: Rh for heating power supply, Rc for cooling power supply, W for heating, Y for cooling, and C for common neutral to supply the thermostat with power. The thermostat can switch on heating by connecting Rh to W and it can switch on cooling by connecting Rc to Y. Virtually all industry-standard low-voltage thermostats now sold on the North American market have terminals marked with these letters, so installation is trivial. In other countries, the letters and associated color codings may be changed appropriately.

Operation

The adapter will work with the vast majority of industry-standard low-voltage thermostats and handle heating/cooling changeovers correctly for various types of thermostats, allowing easy conversion of legacy fan-coil units where residents regulate the temperature by opening the window and are not billed for that waste to using modern thermostats and individual billing per unit.

The simplest thermostats have to be set manually into heating or cooling mode. In this case, if a changeover occurs and, for example, the thermostat is set to heating while the fan-coil unit provides cooling, the fan-coil unit will simply not operate. This is the correct behavior, since all that the thermostat in this situation can ask the fan-coil unit to do is to heat, and the fan-coil unit is not capable of doing so while chilled water is circulating.

More advanced thermostats have modes, often called 'Auto', where they automatically switch between heating and cooling. In this case, the fan-coil unit will operate either if the thermostat signals heating and the fan-coil unit carries hot water, or if thermostat signals cooling and the fan-coil unit carries chilled water. It will not operate if the thermostat's desired operation is the opposite of what can be achieved with the water temperature in the fan-coil unit.

Usage Counter & Wireless Communication

Existing two-pipe HVAC systems usually do not have any provision for billing individual users for the heat and cold they have consumed. This encourages wasteful behavior, such as letting the heat or air conditioning run all the time instead of programming a schedule. It also leads to inequitable cost allocations, for example through rents or assessments that are equal for all residents, even though their contributions to the cost incurred may have been very unequal. The present embodiment solves this problem by counting heating and cooling use individually for each unit.

In sufficiently small time increments, which may be one second long, a microcontroller that is part of the adapter updates one or several operating counters in non-volatile memory, which may be flash memory or EEPROM. If the temperature sensor 224 measures a temperature of the incoming heating/cooling medium that is sufficient for heating operation and the thermostat requests heating, the microcontroller causes the fan-coil unit to run, and for each second the fan-coil unit is running in that condition, the microcontroller increments a counter for seconds of heating. Similarly, for each second when the thermostat requests cooling and the temperature of the heating/cooling medium is below a certain threshold that allows cooling, the microcontroller updates a counter for seconds of cooling. The non-volatile memory used may either be integrated into the microcontroller or be added as a separate component.

If the fan-coil unit allows several stages of operation, these may be counted with multipliers corresponding to the heat transfer typically achieved in each state. For example, the counter may count a second of operating at 'high' stage as one operating second, but a second of operating at 'low' stage as only 0.6 operating seconds.

Alternatively, the system may be refined by adding a second temperature sensor at the outflowing heating/cooling medium pipe 120. In that configuration, it is possible to bill based upon temperature difference between the in- and outflowing medium, which allows a more precise measurement of heating or cooling services consumed. The microcontroller checks each second the temperature difference between the inflowing pipe and the outflowing pipe. If the fan-coil unit is energized and the mode is set to heat, the microcontroller increments a heat counter by the amount of the temperature difference between inflowing and outflowing pipe. If the fan-coil unit is energized and the mode is set to cooling, the microcontroller increments a cooling counter by the amount of the temperature difference between inflowing and outflowing pipe. In this way, the heat counter will contain the product of seconds times temperature difference as a measure of how much heat was consumed, and the cooling counter will contain an analogous number as a measure of how much cooling was consumed.

During changeovers or outages, when the temperature in the inflowing pipe is above the temperature that triggers cooling mode and below the temperature that triggers heating mode, the adapter may refuse to run the fan and thus not increment either the heating or the cooling counter since the economic impact of running the fan at a given moment is not clear. Alternatively, during such times when the water flowing into the unit is close to an expected room temperature, operating the fan may increment neither usage counter and thus be free since there is little heat transfer between the heating/cooling medium and the air in the room.

The values of the counters may be shown on a display 232 on the outside of the adapter, with the display being controlled by the microcontroller. If a display is mounted on the adapter, it is advantageous to mount the adapter on the outside of the fan-coil unit or in another location where it can be seen. In this case, the adapter may to be equipped with a pigtail cable that leads to an electric junction box instead of simple insulated wires coming out of it. The display makes it possible to read the usage counters out manually, for example once per year, for billing purposes. It is also possible to have the display be an external unit that can be mounted anywhere and is connected to the adapter by means of a low-voltage cable.

Alternatively, the values may be transmitted electronically to enable more frequent billing. The adapter may be equipped with a wireless interface, which may follow the ZigBee standard, and that is also controlled by the microcontroller. Transmissions may be encrypted for tamper-protection. If many fan-coil units in a building are equipped with these adapters, their wireless units may form a wireless mesh network that can be read out from a central location. Alternatively, if wireless mesh networking is not practical or desired, the adapters equipped with a ZigBee transmitter may be read out wirelessly through apartment doors with a portable reader in appropriate time intervals, such as once per month. If wireless networking is desired, the adapter again should not be mounted inside a metallic electric junction box. It may be mounted within a plastic junction box where electrical codes permit, it may be equipped with a pigtail cable leading into a metallic junction box, or it may have an external transmitter connected to the main adapter by a low-voltage cable. It is also possible to use a wire of the thermostat cable, for example the C wire, as an antenna, provided that the high frequency part is insulated from the low-frequency AC, for example by means of RC or LC filters.

Figure 3:
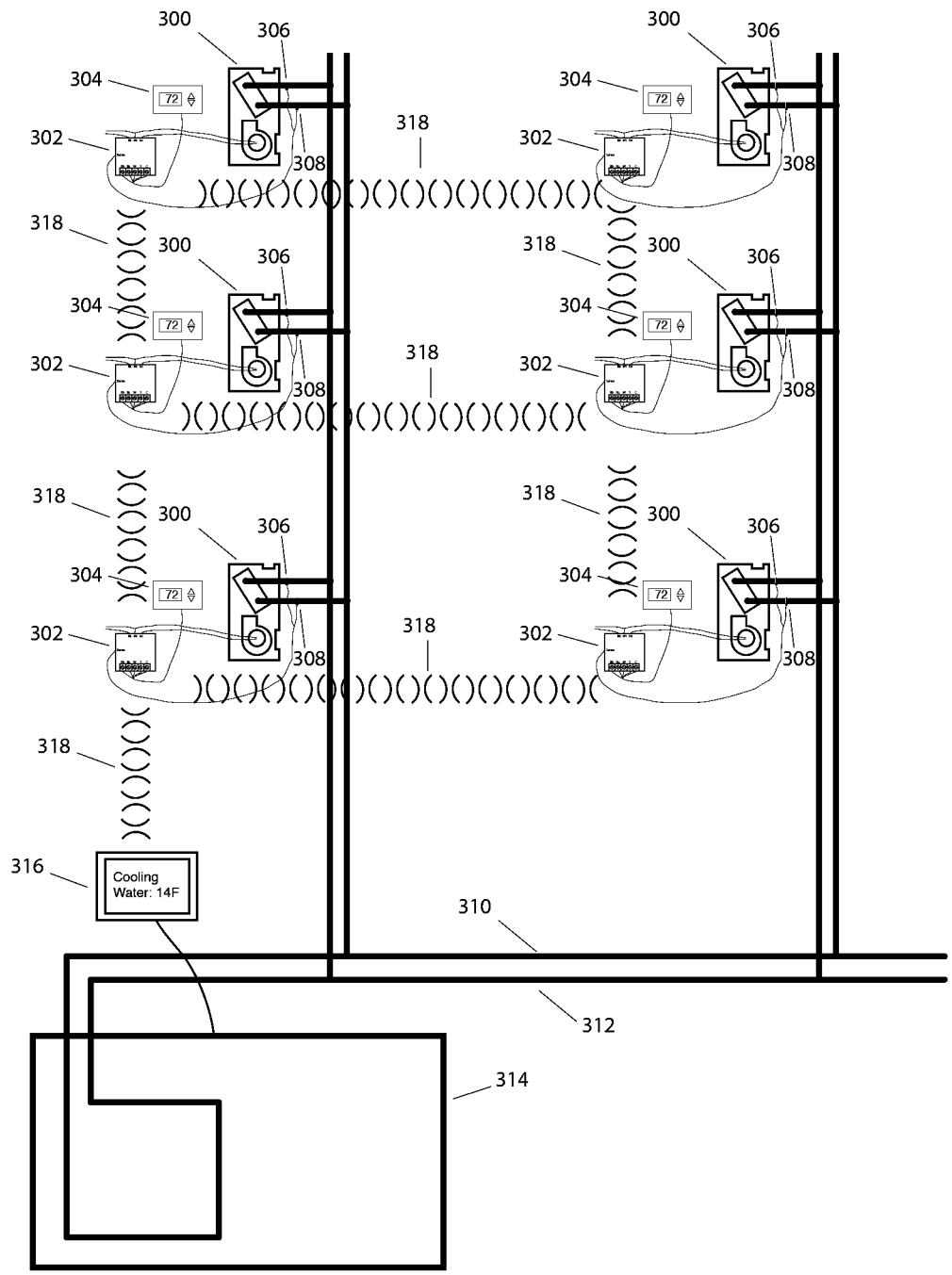
FIG. 3 shows an embodiment of the adapter where several adapters communicate wirelessly with the central HVAC plant.

FIG. 3 shows an implementation of this embodiment using a wireless mesh network. A plurality of fan-coil units 300 are connected to pipes 310 and 312 carrying hot or chilled water from and to the central HVAC plant 314. Each fan-coil unit is equipped with an adapter 302 that is connected to temperature sensors 306 and 308 for the water entering and leaving the fan-coil unit. The adapters 302 are connected to low-voltage thermostats 304. The adapters maintain a wireless ZigBee mesh network among each other. The mesh network makes it possible that the range of each wireless transmitter does not have to extend all the way to a central control station, but merely to some other adapters that will forward data traffic. A central control station 316 for the HVAC plant 314 is also connected to the wireless mesh network and in certain time intervals queries each adapter's usage counters, which are then used for billing each resident.

If the possibility of fraud is an issue, it may be desirable to secure parts that would allow tampering with tamper-evident seals. This includes the electrical connection from the adapter to the fan-coil unit and the thermal connections of the temperature sensors on the in- and outflowing water pipes.

Instead of a wireless data network, a wire-based network, such as Ethernet, may also be used.

Conclusion

As we discussed in the introduction, existing fan-coil systems are wasteful both for the technological reason that previously it has been hard to retrofit a modern thermostat to them as well as for the economic reason that it has not been possible to bill individual units for their use, thus eliminating price incentives to avoid wasteful use. The reader will see that the embodiment shown and discussed resolves both these problems. It allows connecting a thermostat to an existing fan-coil unit with steps roughly equivalent to installing a light switch, and it allows individual billing of heating and cooling use, creating an incentive to avoid waste and allocating cost more fairly. By allowing the user to connect his own thermostats, users are free to install modern smart thermostats that may offer functions like automatic learning of setpoints or remote access, and as the technology of smart thermostats improves rapidly users may install newer thermostats without having to touch the fan-coil unit or dangerous mains voltage.

Second Embodiment: Real-Time Billing, Demand Prediction, and Quality Control

The previous embodiment aggregates heating and cooling usage over time, and thus does not support prices for heating and, more importantly, cooling that change over short time intervals. In some regions, it is now possible to pay for electricity not a fixed rate by kilowatt hour, but a real-time rate that changes frequently based upon supply and demand. If the central cooling plant for the HVAC system is paying real-time rates, which can be substantially cheaper on average than fixed rates if demand is aligned with times of cheap electricity, is it useful to pass these real-time rates on to users so as to provide an incentive for scheduling cooling when energy is cheap and to align billing properly with economic cost.

To this end, the adapter may be equipped with a ZigBee wireless mesh network as described in the first embodiment. A central station connected to the HVAC plant frequently transmits the precise date and time over the network, which the microcontrollers in the adapters installed use to synchronize their internal clocks. The adapters then write the heating and cooling consumption out separately to non-volatile memory for time intervals that may be one hour long. The length and timing of these intervals should coincide with or be an integral fraction of the time intervals used in the real-time billing scheme in use for electricity. The hourly heating and cooling consumptions are downloaded in certain time intervals, which may be once per day, from the adapters to the central HVAC plant's billing system. Once per month, the cost are allocated to the residents. The allocation for heating may simply be based on total use since heating fuel is not usually billed with real-time rates. The allocation for cooling, however, is based on total use for each hour multiplied by the electricity price during each hour.

This makes it possible for residents to connect cost-optimizing thermostats of their choice. Since all communication between the adapter and the thermostat is through industry-standard low-voltage signal lines, most any smart cost-optimizing thermostat can be connected, and as new innovations in the field of cost-optimizing thermostats become available, they can be retrofitted by residents without the need to change anything in the central building structure or the adapters. Since only the low-voltage thermostat cable is involved, thermostat upgrades can be made by the residents themselves or by a handyman who does not need to be an electrician. Thermostats that may be of use to optimize cost may, for example, be of the design taught in U.S. Pat. No. 8,359,124 or of the design taught in my own Provisional Patent Application 61/863,381 for an Energy-Price Optimizer filed on 7 Aug. 2013.

If residents do not want to invest for a modern cost-optimizing thermostat, it is also possible to have a simpler cost-reduction scheme by central control. Residents may notify building management that they want to have their cooling cut off if electricity prices exceed a certain amount, such as 144/kWh. Building management enters these requests into the computer system connected to the central HVAC system that is also responsible for synchronizing time and reading out usage counters over a wireless mesh network. If the real-time electricity price exceeds the price specified by the resident, the computer system automatically sends out a signal to the resident's fan-coil adapter that disables cooling on the fan-coil unit attached. Once real-time electricity prices have fallen below the threshold again, the computer system sends a signal to reactivate cooling. In this way, a simple cost-limiting system is possible even without the use of cost-optimizing thermostats. Residents' requests for cooling to be shut off if a certain energy price is being or is predicted to be exceeded may also be communicated to the central HVAC system through an Internet interface.

This adapter may also be equipped to run precooling before a high-price shutoff if it is possible to anticipate high prices or demand-response events. One way of allowing simple precooling without the need for a thermostat that supports it is for the adapter to infer the need for precooling by storing the last time cooling ran. For example, the adapter may have a rule that if it is notified by a central management unit of a high-price shutoff in half an hour, it will run precooling for that half hour provided that cooling had been operated by the thermostat within the past hour. That simple heuristic will avoid precooling if the thermostat hadn't been actuating cooling because the user is away.

The embodiment described uses real-time electricity prices as the basis for billing cooling. This is advantageous because smart thermostats that can respond to real-time electricity prices are commercially available. It is also possible for the central HVAC system to broadcast a price for cooling that is different from the electricity price and may, for example, take into account capacity overload on a hot day-if the cooling system cannot meet cooling demand from all fan-coil units switched into cooling mode, it will increase price until demand comes down sufficiently so that it can be met. The downside of this possibility is that smart thermostats that can dynamically react to prices broadcast by an in-house cooling system are not currently commercially available, whereas thermostats that can respond to changes in prices in the public electricity grid are, at least with rudimentary functionality at present and with better functionality likely to come to market in the coming years.

The networking infrastructure used for real-time billing may also be used for demand prediction and quality control. Normally, a central heating and cooling plant can only react to changes in demand with a delay. For example if many fan-coil units get shut off by their thermostats at the same time, perhaps because classes in a school building are over, the central HVAC plant will only learn of this once the water in the system has made a complete round through the system and comes back hotter or cooler than expected. This may lead either to suboptimal quality of heating and cooling services or to waste of energy. To avoid this problem, each adapter may signal changes in its current operating state through the network to the central HVAC plant. This makes it possible for the plant to react instantaneously to changes in demand. For example, if cooling demand suddenly increases, the plant may immediately run the cooling equipment more aggressively, and vice versa. Each adapter may also frequently, for example once per minute, transmit the current temperature of the water flowing into the fan-coil unit to the central HVAC plant. This makes it possible to adjust the temperature of the water so as to meet a certain quality of service: for example, there could be a requirement during heating season that at least 95% of fan-coil units that are operating receive water at a certain temperature, and if this temperature is not met the central plant may increase the temperature of its water output or increase its pumping rate.

A special application of real-time pricing is possible even in some markets where customers pay a nominally fixed price for electricity. In some electricity markets, customers pay coincident peak charges (CP charges) in addition to the regular price of electricity. These CP charges are calculated by measuring each customer's power consumption through some of the hours during each year that have the highest load on the electric grid, typically afternoon hours in the summer. The customer then pays a CP charge for his load during the CP hours each month for the following year. Effectively, CP charges are economically equivalent to a very high electricity price during specific hours. The building may be subscribed to a CP charge warning service and use the same logic described here to avoid running air conditioning when real-time prices are high to as to avoid running air conditioning when there is a high risk of the current hour being a CP charge hour.

Third Embodiment: Demand Response

As an alternative or in addition to the real-time billing described in the fifth embodiment, the adapter may also provide a demand-response mechanism. Whereas real-time pricing relies on a market price as the mechanism to balance supply and demand, demand response is a more centrally planned mechanism whereby the utility company operating the grid signals to consumers to reduce electric load during peak demand times. A common arrangement is that consumers of electricity receive a certain rebate per month for allowing the utility company to shut off a big load of theirs, such as an air conditioning unit, for a certain maximum number of hours per month.

In a central HVAC system it is possible to implement demand response centrally. When the utility signals a demand-response event, the cooling system gets shut off until the demand-response event is over. The downside of this solution is that it applies to all units supplied by the central system, and it is not possible for specific fan-coil units to opt in or our of demand response. Use of the present embodiment makes such an individualized response possible.

The control panel 316 in FIG. 3 may be connected through a computer network, radio communications, or power-line signaling to the demand-response mechanism provided by the utility. The control panel 316 maintains a list of adapters and corresponding fan-coil units enrolled in the demand-response program. Units may be enrolled manually at the control panel or through an Internet interface. When the utility signals a demand-response event, the control panel 316 signals that event through the wireless network 318 to those adapters that are enrolled in the program. The adapters, upon receiving this signal, temporarily disable cooling mode. They may signal this to connected thermostats by disconnecting power from the Rc terminal or by pulling the Y terminal (and high cooling stage terminals, if so equipped) to high impedance. When the demand-response event is over, another signal is transmitted from the utility to the control panel, and from the control panel to the enrolled adapters, thus reenabling cooling mode.

The control panel may immediately after receiving the demand-response notification reduce the power of the cooling plant in proportion to the thermal load that has been removed by disabling cooling for the enrolled units, thus enabling an immediate reduction in load and maintenance of the proper coolant temperature.

CONCLUSION, RAMIFICATIONS, AND SCOPE

Accordingly, the reader will see that the various embodiments of the thermostat adapter make it possible to connect an industry-standard, low-voltage thermostat easily and cheaply to control a fan-coil unit to enable connection of a modern thermostat and individual billing by unit as well as participation in dynamic electricity pricing, demand response, and similar schemes to reduce electricity cost and stabilize the electric grid.

Although the description above contains many specificities, these should not be construed as limiting the scope of the embodiments but as merely providing illustrations of some of several embodiments. For example, in some examples of real-time price control we assumed to have fan-coil units installed in apartments occupied by different tenants, but similarly in a school, where all the usage is paid for by the same party, the school may set different price-response policies for different rooms, such as classrooms and offices.

Thus the scope of the embodiments should be determined by the appended claims and their legal equivalents rather than by the examples given.

I claim:

1. A heating or cooling system comprising a central plant providing a heating or cooling medium to a plurality of heat transfer units and controllers connected to said heat transfer units, said controllers comprising communication circuits and electronic control circuits, said control circuits being adapted to reduce said heat transfer units' heating or cooling power by reducing heat transfer between said units' environment and said medium in response to a price signal indicating a price of heating or cooling or of resources used by said central plant in heating or cooling said heating or cooling medium, each of said controllers configured to be controlled by a user, said price signal being characterized by being an electronic signal that takes one value at a time out of a plurality of values, said value indicating a smaller or larger price per unit of heating or cooling services or of said resources used by said central plant in providing said heating or cooling services, said one value being said price, said price corresponding to a financial obligation for the use of said heating or cooling services or said resources used by said central plant, or said price being an accounting unit of scarcity without a financial obligation being created.

2. The system of claim 1 said heat transfer units are fan-coil units.

3. The system of claim 1 said controllers are further adapted to have a user setting, said user setting being characterized by taking one state at a time out of a plurality of mutually exclusive states, and being modifiable by an input signal, said state being where said controllers are further adapted to have a first response characteristic to changes in said scarcity or price when said user setting is set to a first state taken from said plurality of mutually exclusive states and to have a second response characteristic to changes in said scarcity or price when said user setting is set to a second state taken from said plurality of mutually exclusive states, said second response characteristic being selected so that there exists a value of said price signal where said controllers reduce said heating or cooling power of said heat transfer unit by a larger amount than under said first response characteristic, and said second response characteristic being selected so that said controllers reduce said heating or cooling power of said heat transfer unit no less than under said first response characteristic for all values of said price signal.

4. The system of claim 2 said controllers are adapters connecting thermostats to said fan-coil units.

5. The system of claim 1 said controllers are connected to a digital network.

6. The system of claim 5 said network is a wireless network.

7. The system of claim 6 said network is a mesh network.

8. The system of claim 1 said price signal comprises electronic signals about a timing of a demand-response event in an electric grid or a price associated with said event.

9. The system of claim 1 said price signal comprises electronic signals about a timing of changes in the price of electricity in an electric grid.

10. The system of claim 9 said price signal comprises electronic signals about a real-time electricity price, said price becoming known no more than forty-eight hours before a pricing period to which it applies.

11. The system of claim 9 said price signal comprises electronic signals about the timing of a coincident peak charge measurement period.

12. The system of claim 1 said price signal comprises a measure of the overall load of said central plant.

13. The system of claim 1 said controllers are adapted to precool or preheat in anticipation of said reduction in heating or cooling power.

* * * * *